3,079,364
PROCESS FOR ACCELERATING THE PEROXIDIC HARDENING OF UNSATURATED, PHOSPHORUS-CONTAINING POLYESTERS BY MEANS OF AN ISOCYANATE
Heinz Schmidt, Frankfurt am Main, Germany, assignor to Farbwerke Hoechst Aktiengesellschaft vormals Meister Lucius & Brüning, Frankfurt am Main, Germany, a corporation of Germany
No Drawing. Filed Aug. 5, 1958, Ser. No. 753,214
Claims priority, application Germany Aug. 9, 1957
9 Claims. (Cl. 260—45.4)

The present invention relates to a process for accelerating the hardening by means of peroxides of unsaturated polyesters containing radicals of phosphorated acids.

It is known to harden unsaturated polyester resins by means of radical-forming substances either in the heat (thermosetting) or at normal temperature (cold-setting). The catalysts generally used for the thermosetting are peroxides, such as benzoyl peroxide, or azo compounds, such as azoiso-butyronitrile. The cold-setting of unsaturated polyester resins is brought about by means of hydroperoxides or peroxides in the presence of accelerators. Catalyst systems used in general in the cold-setting are, for example, benzoyl peroxide as activator with dimethyl aniline as accelerator or methylethyl ketone peroxide as activator with cobalt naphthenate as accelerator.

By the use of suitable accelerators it is possible to carry out the hardening under mild conditions at room temperature, e.g. about 20° C. and to obtain products having favorable mechanical and electrical properties.

It is known to react linear unsaturated polyesters containing hydroxyl groups with aromatic or aliphatic diisocyanates in a manner such that free hydroxyl groups are still present after the reaction. The polyesters which have been reacted with isocyanates and which contain no longer free isocyanate groups are then mixed with vinyl or allyl compounds and polymerized in the presence of peroxides in the usual manner. Furthermore, it is known to react polyesters containing terminal hydroxyl groups with any diisocyanate in the presence of styrene and subsequently to harden the reaction product with the addition of peroxides and tertiary amines. Thus modified polyester resins are obtained having a particular stability to chemicals. Moreover it is known to polymerize unsaturated polyesters together with a monomeric compound and a diisocyanate in the presence of a common polymerization catalyst, for example a system consisting of cobalt naphethnate and methylethyl ketone peroxide; the products thus obtained are cross-linked, have longer chains and possess improved mechanical properties.

In the aforesaid process for molecule growth in addition to the linkage by means of diisocyanates, the proper polymerization is brought about with the aid of known catalysts, if desired in the presence of usual accelerators.

In the case of unsaturated polyesters containing radicals of phosphorated acids or mixtures of said polyesters with vinyl compounds, such as styrene, the common accelerators fail to work, for example cobalt naphthenate, or sometimes even act as inhibitors so that there is a great demand for other active catalyst systems.

Now I have found that the setting by means of peroxides, particularly hydroperoxides, of unsaturated polyesters containing radicals of phosphorated acids, as obtained by condensation of α-β unsaturated polybasic carboxylic acids, or mixtures thereof with saturated acids, with polyhydric alcohols and with suitable phosphorus compounds, for example phosphorus trichloride, phosphorus oxychloride, phenyl-phosphinic dichloride, or of mixtures of said polyesters with vinyl compounds such as, above all, substituted and unsubstituted phenyl-vinyl compounds, for example α-methyl-styrene and styrene on account of their good compatibility; furthermore substituted or unsubstituted vinyl esters, for example vinyl acetate, vinyl chloracetate, vinyl propionate; vinyl nitriles, for example acrylonitrile, can be considerably accelerated by the addition of 0.001—10% by weight, calculated on the amount of polmerizable substance, of a compound of the general formula $$R(N=C=O)_x$$

wherein $x$ in an integer in the range from 1–4, R stands for a hydrogen atom, a mono- or polyvalent alkyl, alkylene, aryl, aralkyl, alkylaryl, cycloalkyl or heterocyclic radical, and wherein R may furthermore be substituted by other groups which do not react with diisocyanates, for example halogen, nitro or alkoxy groups such as methoxy or butoxy groups. The phosphorus-containing unsaturated polyester may likewise be used in admixture with allyl esters of polybasic acids, such as triallylcyanurate or diallyl esters of phthalic acids.

When mixtures of the aforesaid unsaturated phosphorus-containing polyesters with vinyl compounds or allyl esters of polybasic acids are hardened the content of polyesters shall, in general, not be less than 50% by weight, calculated on the total mixture.

As suitable accelerators there may be used in the process of the invention aliphatic, cycloaliphatic and aromatic monoisocyanates such as octadecyl-isocyanate, n-dodecyl-isocyanate, cyclohexyl-isocyanate, phenylisocyanate; aliphatic, cycloaliphatic and aromatic polyisocyanates such as tetramethylene-diisocyanate, hexamethylene-diisocyanate, the various isomeric naphthylene-diisocyanates, toluylene-diisocyanates, naphthylene-triisocyanates, 4,4'-dicyclohexylmethane-diisocyanate, etc. The isocyanates may be used per se or in admixture with one another.

The substances which correspond to the aforesaid general formula cause, together with peroxide catalysts, for example dialkyl, diaryl, arylalkyl, acyl peroxides, hydroperoxides, per acids and per esters (a great number of catalysts is specified in the third chapter of the book, "Polyesters and Their Application," by John Bjorksten, Henry Tovey, Bethy Harker and James Henning, Reinhold Publishing Corporation, New York, 1956), a much more rapid and, with respect to the obtainable mechanical values and the values of the water absorption, a more favorable setting of the phosphorus-containing unsaturated polyester resins than the aforesaid peroxides alone.

The gelatinisation and setting periods of phosphorus-containing unsaturated polyesters can be easily regulated in suitable manner by varying the kind and amount of the added accelerator and activator as well as the temperature.

The activity of the accelerator can be easily determined in preliminary tests by the reduction of the gelation period of the resins upon the addition of the accelerator.

The unsaturated polyester resins admixed, according to the process of the invention, with mono- and/or polyisocyanates as accelerator are suitable as casting resins, coating masses, lacquers, dispersions and adhesives. Prior to the hardening there may be added fillers such as silicon dioxide, dyestuffs, pigments, plasticizers, or reinforcing materials, for example glass fibers, to the polyesters.

The following examples serve to illustrate the invention but they are not intended to limit it thereto; the parts being by weight unless otherwise stated.

Example 1

720 parts of diethylene glycol are introduced into a four-necked flask provided with stirring device, water separator with mounted reflux condenser and gas inlet tube, dropping funnel and thermometer. 1200 parts of phenylphosphonous dichloride are then added slowly at a temperature of 50 to 70° C. by means of the dropping funnel, while stirring continuously. The temperature is then gradually increased to 160° C. and the pressure is reduced until the hydrogen chloride is completely eliminated, this being tested with silver nitrate in an aqueous solution or suspension of a sample of the reaction mixture in nitric acid solution.

After having cooled to about 80° C. the reaction mixture is admixed in the same flask with 700 parts of diethylene glycol, 660 parts of maleic anhydride and 100 parts of xylene and the whole is reacted at a temperature in the range from 140–170° C., the xylene serving as water entrainer. In addition to an esterification a re-esterification takes place simultaneously. A high molecular, nearly colorless and difficultly inflammable product is obtained which is insoluble in water and well soluble in organic solvents.

7 grams of the resin obtained were mixed with 3 grams of styrene and to the mixture there were added 2% by weight of methylethyl-ketone peroxide solution (of 40% strength in dimethyl phthalate) and varying amounts of octadecylisocyanate. The gelation periods were determined at 25° C. in a thermostat. In the following table there are given the gelation periods compared to the gelation periods of the same resin admixed with cobalt naphthenate solution of 1% strength in styrene as accelerator (calculated on cobalt).

The percentage figures in the following tables are calculated on the total amount of resin (polyester plus styrene).

| Percent of octadecylisocyanate calculated on the total resin | Gelation period, minutes | Percent of cobalt-napthenate solution (1% of Co in styrene) | Gelation period, minutes |
| --- | --- | --- | --- |
| 0 | 68 | 0 | 68 |
| 0.2 | 35 | 0.1 | 127 |
| 0.5 | 26 | 1 | 147 |
| 1 | 25 | 2 | 144 |
| 1.5 | 14 | ------ | ------ |
| 2 | 4 | ------ | ------ |

Example 2

The test was carried out as described in Example 1 but 2% by weight of cyclohexanone peroxide solution (of 50% strength in cyclohexanone) was used as activator instead of methylethyl-ketone peroxide solution.

Percent of octadecylisocyanate:     Gelation period, min.
0 ------------------------------------------ 156
0.2 ---------------------------------------- 156
0.5 ---------------------------------------- 64
1 ------------------------------------------ 58
2 ------------------------------------------ 27

Example 3

The test was carried out as described in Example 1 but hexamethylene-diisocyanate was used as accelerator instead of octadecyl-isocyanate.

Percent of hexamethylenediisocyanate:    Gelation period, min.
0 ------------------------------------------ 68
0.5 ---------------------------------------- 11
1 ------------------------------------------ 6
2 ------------------------------------------ 5

Example 4

The test was carried out as described in Example 1. Instead of octadecyl-isocyanate there was used as accelerator n-dodecyl-isocyanate.

Percent of dodecylisocyanate:     Gelation period, min.
0 ------------------------------------------ 68
0.5 ---------------------------------------- 33
1 ------------------------------------------ 22
2 ------------------------------------------ 12

Example 5

The test was carried out as described in Example 1. Instead of octadecyl-isocyanate there was used as accelerator cyclohexyl-isocyanate.

Percent of cyclohexylisocyanate:    Gelation period, min.
0 ------------------------------------------ 68
0.5 ---------------------------------------- 17
1 ------------------------------------------ 8
2 ------------------------------------------ 3

Example 6

The test was carried out as described in Example 1. Instead of octadecyl-isocyanate there was used as accelerator phenyl-isocyanate.

Percent of phenylisocyanate:     Gelation period, min.
0.2 ---------------------------------------- 127
1 ------------------------------------------ 126
2 ------------------------------------------ 26

Example 7

The test was carried out as described in Example 4. As activator there was used 2% by weight of a butyl peroxide mixture containing 75% by weight of peroxides.

Percent of dodecylisocyanate     Gelation period, min.
0.5 ---------------------------------------- 64
1 ------------------------------------------ 20
2 ------------------------------------------ 6

Example 8

There were tested the mechanical properties of a synthetic resin produced from 30% by weight of styrene (calculated on the total mixture) and 70% by weight of the phosphorus-containing unsaturated polyester resin according to Example 1. The synthetic resin was hardened in the cold in the presence of 2% by weight of methylethyl-ketone peroxide solution (40% strength in dimethyl phthalate):

(a) By a known process with 1% by weight of cobalt naphthenate solution (1% of cobalt in styrene)

(b) By the process according to the invention with 0.5% by weight of octadecyl-isocyanate The after-hardening was effected within 1.5 hours at 100° C.

| | (a) Cobalt naphthenate as accelerator | (b) Octadecyl isocyanate as accelerator |
| --- | --- | --- |
| Tensile strength (kg./cm.$^2$) | 260 | 310 |
| Elongation (percent) | 12 | 9 |
| Flexural strength (kg./cm.$^2$) | 485 | 545 |
| Deflection (mm.) | 3.8 | 16.0 |
| Ball pressure hardness (kg./cm.$^2$) 10″/60″ | 795/675 | 630/540 |
| Impact strength (cm. kg./cm.$^2$) | 1.6 | 6.11 |
| Water absorption, hours: | | |
| 24 | 0.40 | 0.01 |
| 96 | 0.82 | 0.24 |

[1] Without break.

It results from the above table that the phosphorus-containing polyester resins hardened with isocyanate accelerators have improved mechanical properties and they absorb a smaller amount of water than resins hardened with cobalt naphthenate as accelerator.

I claim:

1. In the process for cross-linking, by means of organic peroxides, ethylenically unsaturated double bonds of an unsaturated polyester obtained by condensing (1) a polyhydric alcohol, (2) a member of the group consisting of α-β unsaturated polybasic carboxylic acids and mixtures of said acids with saturated acids, and (3) a member of the group consisting of phosphorus trichloride, phosphorus oxychloride, phenyl phosphinic dichloride, the step which comprises adding to said polyester, as an accelerator for the catalytic activity of the peroxide, 0.001 to 10 percent, by weight of polymerizable products of at least one isocyanate of the formula $$R(N=C=O)_x$$

wherein $x$ is an integer between 1 and 3 inclusive and R is a member selected from the group consisting of a hydrogen atom and mono- and polyvalent alkyl, alkylene, aryl, aralkyl, alkylaryl, cycloalkyl, and heterocyclic radicals.

2. The process of claim 1 wherein the organic peroxide is an organic hydroperoxide.

3. The process of claim 1 wherein the isocyanate is a monoisocyanate.

4. The process of claim 1 wherein the polyester is admixed with up to 50%, calculated on the mixture, of a vinyl monomer.

5. The process of claim 4 wherein the vinyl monomer is selected from the group consisting of styrene, methylstyrene, vinyl acetate, vinyl chloroacetate, vinyl propionate, acrylonitrile, triallyl cyanurate and diallyl phthalate.

6. The process of claim 1 wherein the polyester is admixed with up to 50%, calculated on the mixture, of styrene.

7. The process of claim 3 wherein the polyester is admixed with up to 50%, calculated on the mixture, of styrene.

8. The process of claim 1 wherein the amount of isocyanate added is in the range between 0.001 and 2%, calculated on the weight of polymerizable products.

9. The process of claim 3 wherein the isocyanate is octadecyl isocyanate.

References Cited in the file of this patent

UNITED STATES PATENTS

| | | |
|---|---|---|
| 2,503,209 | Nyquist et al. | Apr. 4, 1950 |
| 2,591,884 | Simon et al. | Apr. 8, 1952 |
| 2,722,538 | Jackson | Nov. 1, 1955 |
| 2,819,247 | Lundberg | Jan. 7, 1958 |
| 2,824,085 | Cummings | Feb. 18, 1958 |
| 2,879,248 | Nischk et al. | Mar. 24, 1959 |

FOREIGN PATENTS

| | | |
|---|---|---|
| 744,027 | Great Britain | Jan. 5, 1956 |